United States Patent [19]

Amaral et al.

[11] 4,089,742

[45] May 16, 1978

[54] NUCLEAR FUEL ELEMENT SPACER MEANS

[75] Inventors: Louis Amaral; Kenneth Wood Brayman; Bart Alan Smith, all of San Jose, Calif.

[73] Assignee: General Electric Company, San Jose, Calif.

[21] Appl. No.: 737,230

[22] Filed: Nov. 1, 1976

Related U.S. Application Data

[63] Continuation of Ser. No. 573,724, May 1, 1975, abandoned.

[51] Int. Cl.² .................................................. G21C 3/30
[52] U.S. Cl. ........................................... 176/78; 176/76
[58] Field of Search .................... 42/1; 176/76, 78, 79

[56] References Cited

U.S. PATENT DOCUMENTS

| 1,246,258 | 11/1917 | Gerace | 42/1 |
|---|---|---|---|
| 1,897,992 | 2/1933 | Ailes | 42/1 |
| 3,298,125 | 1/1967 | Adrian et al. | 42/1 |
| 3,515,638 | 6/1970 | Nims, Jr. | 176/78 X |
| 3,654,077 | 4/1972 | Lass et al. | 176/78 X |
| 3,713,974 | 1/1973 | Previti et al. | 176/78 X |
| 3,795,040 | 3/1974 | Jabsen | 176/78 X |
| 3,802,995 | 4/1974 | Fritz et al. | 176/78 X |
| 3,864,211 | 2/1975 | King et al. | 176/76 X |

*Primary Examiner*—Peter A. Nelson
*Attorney, Agent, or Firm*—Ivor J. James, Jr.; Samuel E. Turner; Sam E. Laub

[57] ABSTRACT

A spacer retaining element, which may be a fuel rod or water-containing rod, is provided with axially-spaced lugs, each adapted to be received in a slot in a fuel element spacer of a nuclear fuel assembly. When assembled, the lugs maintain proper axial spacing between the individual spacers and the lug-slot arrangement prevents the rod from rotating. Moreover, because the slot in the spacer can receive the lug from only one direction, the arrangement prevents the spacer from being inserted into the assembly upside down.

3 Claims, 5 Drawing Figures

NUCLEAR FUEL ELEMENT SPACER MEANS

This is a continuation of application Ser. No. 573,724, filed May 1, 1975, and now abandoned.

BACKGROUND OF THE INVENTION

In a known type of reactor, for example, as used in the Dresden Nuclear Power Station near Chicago, Ill., the reactor core is of the heterogeneous type. That is, the nuclear fuel is in the form of elongated cladded rods. These fuel rods or elements are grouped together and contained in open-ended tubular flow channels to form separately removable fuel assemblies or bundles. A sufficient number of fuel assemblies are arranged in a matrix to form the nuclear reactor core capable of self-sustained fission reaction. The core is submersed in a fluid, such as light water, which serves both as a coolant and as a neutron moderator.

A typical fuel assembly may be formed, for example, by an 8 × 8 array of spaced fuel rods supported between upper and lower tie plates, the rods being several feet in length, approximately one-half inch in diameter, and spaced from one another by a fraction of an inch. To provide proper coolant flow past the fuel rods it is important to maintain the fuel rods in fixed spaced relation and restrain them from bending and vibrating during reactor operation. A plurality of fuel rod spacers positioned in spaced relation along the length of the fuel assembly are provided for this purpose. Such fuel rod spacers are shown, for example, by J. L. Lass et al in U.S. Pat. No. 3,654,077.

A problem in the design of such a fuel assembly is to provide an efficient, effective arrangement to maintain the fuel rod spacers in their proper axially spaced positions without the use of excessive structural materials. It is extremely important to minimize the amount of structural material in the core of a reactor because such material is a neutron poison which unproductively captures neutrons and an additional amount of costly fuel may be required to compensate for the resulting neutron loss.

Several approaches to the problem of retaining fuel rod spacers in their proper axial positions are known. In an arrangement shown in U.S. Pat. No. 3,379,618, the fuel rod spacers are attached to a plurality of struts which span the length of the fuel assembly and are secured between upper and lower tie plates. An arrangement shown in U.S. Pat. No. 3,375,172 is somewhat similar except that the struts or longitudinal support members are secured to only one of the tie plates whereby their length, and hence the amount of strut material, may be somewhat reduced.

In another known arrangement the fuel rod spacers are secured in axial position by one or more segmented fuel rods. For example in one such arrangement the connectors between the individual segments of the segmented fuel rods are formed with flanges which engage and secure the fuel rod spacers. Such a segmented fuel rod spacer capture arrangement is shown, for example, by J. L. Lass in U.S. Pat. No. 3,466,226. While the segmented rod arrangement reduces the amount of structure material in the core, as compared to the other arrangements mentioned above, the manufacture of the segmented rod is complicated and expensive. Also the discontinuities in the fuel column caused by the segment connectors are undesirable.

Another arrangement for axially positioning the fuel rod spacers is illustrated in U.S. Pat. No. 3,802,995. There, axially spaced lugs are provided on a water tube with each lug fitting between spaced elements forming the fuel rod spacer. Such arrangement overcomes many of the shortcomings expressed above with respect to arrangements prior thereto; however, even this arrangement necessitates relatively expensive square plug or extension fitting into a relatively expensive square hole in the bottom tie plate to prevent the tube from rotating and disengaging the lugs from the spacers. Moreover, this arrangement does not prevent the insertion of the fuel rod spacer into the assembly upside down.

Accordingly, it is an object of the present invention to provide an improved nuclear fuel element spacer retaining means which obviates the relatively expensive square end plug and also provides assurance that the fuel rod spacer will not be installed into the assembly upside down.

SUMMARY OF THE INVENTION

Briefly stated in accordance with one aspect of the present invention, there is provided a fuel assembly for a nuclear reactor having a plurality of elongated fuel rods or elements and at least one water-containing element. A plurality of axially-spaced fuel rod spacers are provided to retain the elements in laterally spaced relation to one another and to minimize bending and vibration. At least one of the elements serves as a retaining element and is formed with a plurality of lugs individually engaging respective ones of the spacers to retain the spacers in spaced axial position. At least one of the spacers has a slot therein to receive one of the lugs. Once the lug is received in the slot, the element is restrained from rotation about its own axis.

BRIEF DESCRIPTION OF THE DRAWINGS

While the specification concludes with claims particularly pointing out and distinctly claiming the subject matter which is regarded as the invention, it is believed the invention will be better understood from the following description of the preferred embodiment taken in connection with the accompanying drawings, in which:

DESCRIPTION OF THE PREFERRED EMBODIMENT

Figure 1:
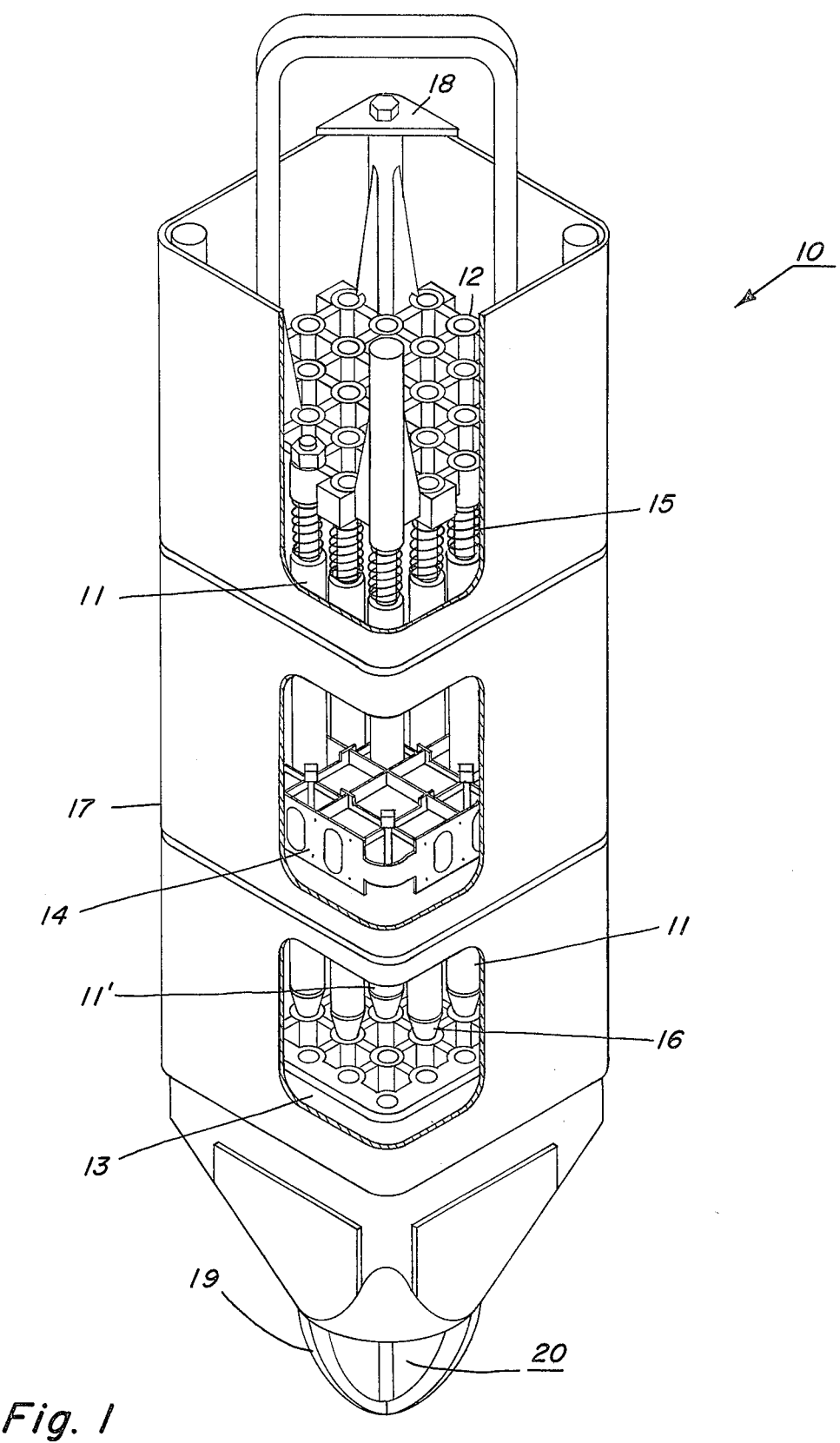
FIG. 1 is a perspective view, partially cut away to show details, of a fuel assembly.

Referring now to the drawings, and initially to FIG. 1 thereof, there is illustrated a fuel assembly 10 comprising a plurality of elongated elements or fuel rods 11 supported between an upper tie plate 12 and a lower tie plate 13. The fuel rods 11 pass through a plurality of fuel rod spacers 14 which retain the elongated rods in axially spaced relation and restrain them from lateral vibration. In accordance with the present invention the fuel rod spacers 14 are retained in spaced axial position by a special rod 11'.

Each of the fuel rods 11 comprises an elongated tube containing the fissile fuel, in the form of pellets, particles, powder or the like, sealed in the tube by upper and lower end plugs 15 and 16. Lower end plugs 16 are formed with a taper for registration and support in respective cavities formed in lower tie plate 13. Upper end plugs 15 are formed with extensions which register with support cavities in the upper tie plate 12.

Several of the support cavities in the lower tie plate 13 (for example, selected ones of the edge or peripheral cavities) are formed with threads to receive fuel rods having threaded lower end plugs. The extensions of the upper end plugs 15 of these same fuel rods are elongated to pass through their respective cavities in the upper tie plate 12 and they are formed with threads to receive retaining nuts. In this manner fuel rods 11, the fuel rod spacers 14 and the upper and lower tie plates 12 and 13 are formed into a unitary structure.

The fuel assembly 10 further includes a thin-walled tubular flow channel 17, of substantially square cross section, adapted to receive the upper and lower tie plates 12 and 13 and spacers 14 in a manner whereby the flow channel 17 readily may be mounted and removed therefrom. A tab 18 is provided for fastening the flow channel 17 to the fuel assembly.

The lower tie plate 13 is formed with a nose piece 19 adapted to support the fuel assembly in a socket of a support plate in the reactor. The end of the nose piece is formed with openings 20 to receive pressurized coolant so that it flows upward past the fuel rods.

Figure 2:
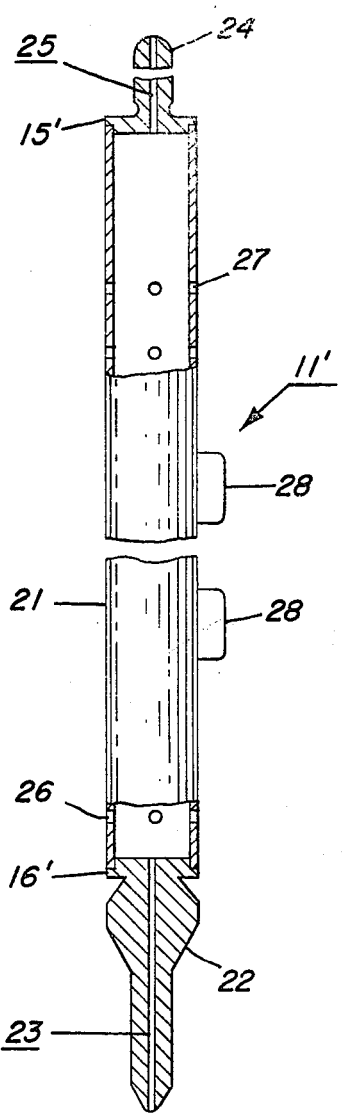
FIG. 2 is an elevational view, partially in section, of an elongated water-containing element.

Referring now to FIG. 2, rod 11' is illustrated in greater detail. Rod 11' is shown as comprising a water-containing tube or rod as opposed to a fuel-containing rod. It will become apparent to those skilled in the art as this description proceeds that the special rod 11' could be either a fuel-containing rod or a water-containing rod. In the preferred form of the present invention, special rod 11' is a water-containing rod. Rod 11' comprises a continuous or unsegmented elongated tube 21 formed of a material suitable for use in a reactor core, preferably zirconium. A lower end plug 16' is attached to the lower end of tube 21 and is formed with a conical surface 22 and a central passage 23. Passage 23 conducts coolant from nose piece 19 up into tube 21.

An upper end plug 15' is attached to the upper end of tube 21 and is formed with an extension 24 adapted to fit into a cavity in upper tie plate 13. A central passage 25 may be formed through end plug 15' to provide an exit for coolant-moderator flow through tube 21.

Tube 21 may also be provided with a plurality of coolant inlet holes 26 near the lower part of tube 21 and a plurality of coolant outlet holes 27 in the upper part of tube 21. The outlet holes 27 may be graduated in number and/or size so that a substantial portion of the relatively cool coolant in tube 21 exits therefrom at a desired elevation in the fuel assembly to enhance cooling and moderation of the adjacent fuel elements at that elevation, for example, in the upper half of the fuel assembly.

In accordance with the present invention, tube 21 is formed with a plurality of radially extending, axially spaced fins or lugs 28, each of which is adapted to engage a respective one of the fuel rod spacers 14 to retain the spacers 14 in fixed axial position. Lugs 28 may be secured to tube 21 by any suitable means such as, for example, welding.

Figure 3:
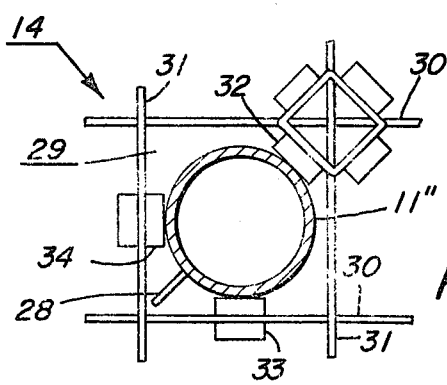
FIGS. 3, 4 and 5 are fragmentary detail views illustrating the engagement of the lug with the spacer element.
Figure 4:
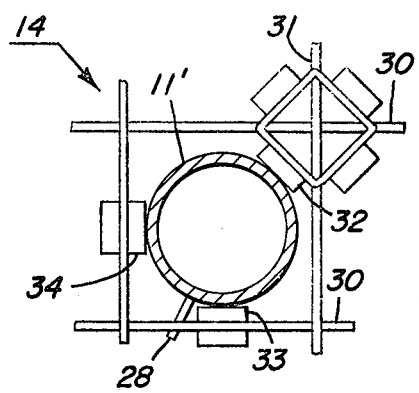
Figure 5:
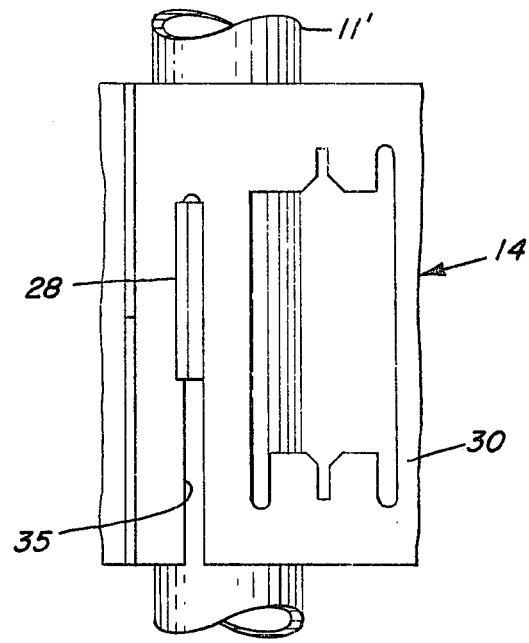

FIGS. 3, 4 and 5 illustrate the insertion of tube 11' into the fuel assembly and its engagement with spacers 14. A generally square tube passage 29 is formed by intersecting members 30 and 31 as shown and described in greater detail in the aforementioned U.S. Pat. No. 3,654,077. A spring 32 exerts a lateral force on tube 11' to force it into lateral engagement with a pair of members 33 and 34 formed, respectively, in members 30 and 31. Tube 11' is inserted into passage 29, as shown in FIG. 3, such that lugs 28 extend into the diagonal of the passage 29 toward the corner between members 33 and 34. Tube 11' is thus moved until lugs 28 are positioned below their respective spaces. Tube 11' is then rotated approximately 30 degrees counterclockwise, as shown in FIG. 4, to bring the lugs into registry with an open-end slot 35 (FIG. 5). Tube 11' is then moved axially upward to bring lug 28 into slot 35 until it butts against the upper closed end of slot 35. Spacers 14 are now captured by lugs 28 and, due to the interface between lugs 28 and slot 35, tube 11' is prevented from rotating. The lower tie plate 13 is then installed so that, as conical surface 22 seats in the recess in the lower tie plate 13, further axial movement of rod 11' is prevented.

The arrangement described above accurately positions spacers 14 relative to one another axially of the fuel rods 11. Moreover, because slot 35 opens in one direction only, the arrangement provides a means to prevent any of the spacers 14 from being inserted into the assembly upside down. Additionally, because of the interaction between lug 28 and the slot 35, which is only slightly greater in width than the width of lug 28, the relatively expensive square cross section extension on the lower end plug, and its associated square hole in the lower tie plate, are eliminated. Thus, the present invention provides a number of significant advantages over the prior art.

As will be evident from the foregoing description, certain aspects of the invention are not limited to the particular details of construction of the example illustrated, and it is contemplated that various other modifications or applications will occur to those skilled in the art. It is, therefore, intended that the appended claims shall cover such modifications and applications as do not depart from the true spirit and scope of the invention.

What we claim as new and desire to secure by Letters Patent of the United States is:

1. A fuel assembly for a nuclear reactor comprising:
    (a) a plurality of elongated elements including fuel elements supported between upper and lower tie plates,
    (b) a plurality of axially-spaced element spacers positioned between said upper and lower tie plates to retain said elements in laterally spaced relation to one another, said spacers including a plurality of intersecting members forming passages for said elements,
    (c) at least one of said elements serving as a spacer retaining element and being formed with a plurality of laterally extending lugs secured thereto and individually engaging one of said members of respective ones of said spacers to retain said spacers in spaced axial position,
    (d) each of said one of said members being formed with a vertically extending slot therethrough to removably receive one of said lugs, said slot having an open end and a closed end,
    (e) whereby said one element is prevented by said one of said members of said spacers from rotation about its own axis when said one lug is received within said slot,
    (f) said open end of said slot facing downwardly whereby said lugs engage the closed upper ends of said slots to prevent downward movement of said spacers.

2. The invention of claim 1 wherein said slot is of a width only slightly greater than the width of said lug received therein.

3. The invention of claim 1 wherein the retaining element comprises a water containing element.

* * * * *